UNITED STATES PATENT OFFICE.

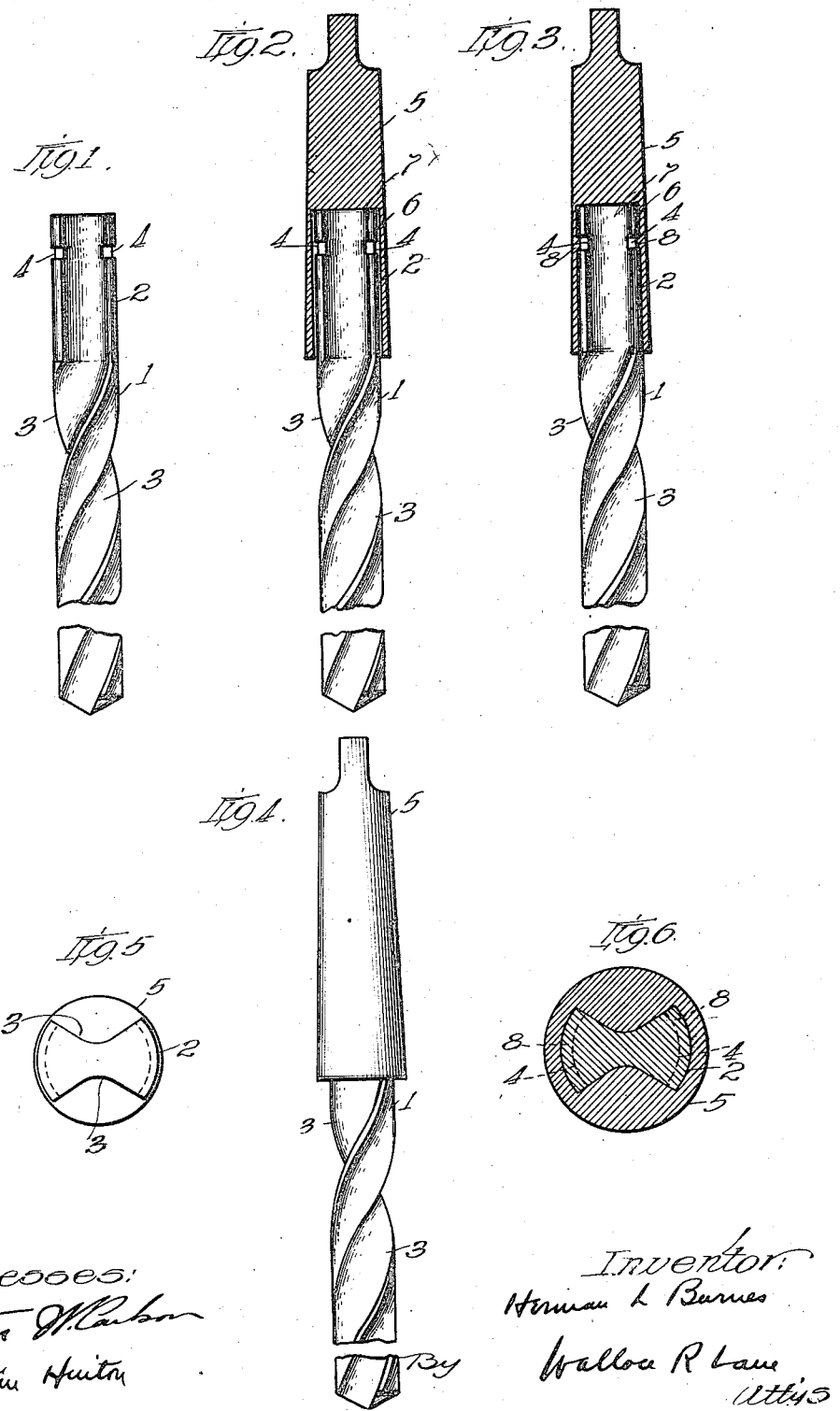

HERMAN L. BARNES, OF WEST PULLMAN, ILLINOIS, ASSIGNOR TO WHITMAN AND BARNES MANUFACTURING COMPANY, OF AKRON, OHIO, A CORPORATION OF OHIO.

METHOD OF MAKING DRILLS.

1,285,589.　　　　Specification of Letters Patent.　　Patented Nov. 26, 1918.

Application filed April 26, 1915. Serial No. 23,831.

*To all whom it may concern:*

Be it known that I, HERMAN L. BARNES, a citizen of the United States, residing at West Pullman, in the county of Cook and State of Illinois, have invented new and useful Improvements in Methods of Making Drills, of which the following is the specification.

This invention relates to a method of uniting a high speed steel drill with a shank formed of cheaper metal.

As is well known, drills are necessarily made of the finest tool steel obtainable. This material is, of course, expensive, and to make the shank and drill both of the same material would be extremely expensive. It has, therefore, heretofore been proposed to make the shank of cheaper material and to unite the drill thereto and this practice has been carried out to some extent. The methods heretofore known, however, of making up the two-part drill in the manner alluded to, consist in either brazing or welding the drill to the metal of the shank, both of which methods are extremely unsatisfactory in practice because of the arduous nature of the work required of the finished tool. Drills brazed in their shanks will not stand up satisfactorily to their duty, but will become loose or break out from the shanks. Drills welded to their shanks are equally faulty for the reason that the welding process introduces a point of weakness at or near the union of the two metals.

It is an object of my invention to overcome the disadvantages of the methods heretofore employed, by combining a drill with its shank in a manner to effect an intimate binding engagement or grip of the shank upon the drill throughout their whole region of contact and without the necessity of brazing or welding the two parts together.

It is another object of my invention to form a socket in the shank of a size and shape just sufficient to snugly receive the drill therein and to thereafter compress the metal of the shank so that it flows over the surface of the drill and comes into intimate contact therewith throughout.

It is another object of my invention to provide means whereby the drill will be positively held against longitudinal displacement in the shank by the metal of the finished shank itself.

In the drawings:

Figures 1, 2 and 3 represent the successive steps in the formation of a drill according to my invention.

Fig. 4 is an elevation of the finished drill.

Fig. 5 is an end view of the finished drill.

Fig. 6 is a cross section showing the method of union of the parts.

In the drawings: 1 represents the drill which, as shown in Fig. 1 is provided with a straight butt portion 2 with longitudinal grooves on either side 3 and which I provide with transverse notches or peripheral grooves 4 for a purpose to be described. 5 represents the unfinished shank into which I sink a recess or socket 6 of a size and shape to snugly engage the butt or straight portion 2 of the drill. The drill 1 is then introduced into the socket 6 until the butt end 7 of the drill is firmly seated against the bottom of the socket and the sides of the socket snugly engage the butt end 2 of the drill both upon its rounded surfaces and throughout its grooves 3. The shank alone is heated prior to the insertion of the drill. This is an important feature as it expands the recess to permit the drill to be inserted, and the subsequent contraction of the metal upon cooling will aid the forging operation, hereinafter described, to cause a binding grip on the drill.

With the parts in the position shown in Fig. 2 the shank 5 is heavily and forcibly compressed around the entire region of its contact with the drill, the pressure applied being heavy enough to cause the metal of the shank to flow readily, and being maintained long enough so that the metal of the shank will have set in its new position and will not spring away or loosen therefrom. The result of this operation is that the metal of the shank is carried into the most intimate contact with the butt end of the drill over its whole periphery, so that not only is the drill tightly seated against the bottom of the stem but is gripped on all sides including the surfaces of its grooves 3 by the metal of the shank. In addition to this grip which the shank has upon the drill, the extreme pressure to which the shank has been subjected will cause the metal of the shank to flow into and fill up completely the notches 4 in the drill, as indicated at 8 in Fig. 3, whereby the drill will be absolutely prevented from the slightest longitudinal movement in the shank. After this operation the completed tool may be removed from the drop forge, or other compressing instrument used, and the shank machined and finished in any way desired. A drill so constructed will be found, and has been found in actual use, to stand up to any work which may be required of it without the slightest tendency to loosen in its socket or otherwise reveal any other structural weakness.

I consider it an important feature of this invention that the drill is seated home in the socket of the shank before the pressure is applied to the shank. Were it not for this feature of the invention it would be impossible to cause the intimate contact between the two different metals from the butt end of the drill, a pipe would necessarily be left in the metal of the shank which would introduce a dangerous structural weakness, worst of all the free space left behind the drill would cause the metal to tend to go in that direction rather than to flow into the necessary intimate engagement with the grooves 3 and notches 4 of the drill, so that not only would the finished drill be structurally weaker, in that a pipe would be left in the shank, but it would be impossible to obtain the necessary intimate contact of the two metals to the degree possible were no such space left behind the drill.

Having now described my invention:

I claim:

1. The method of assembling a drilling tool which consists in providing a solid shank, in providing a drill having longitudinal grooves extending the full length thereof, forming a transverse notch in said drill adjacent the butt end thereof and intersecting said longitudinal grooves, forming a socket extending only partially through said shank and of a size to snugly receive the butt end of said drill, heating the shank, inserting the cold drill into said socket with its butt end in firm contact with the end of said socket, immediately compressing the shank so as to cause it to tightly engage the drill and to force the metal of the shank into the notch of the drill, and maintaining the compressing force until the the metal of the shank is set.

2. The method of assembling a drilling tool which consists in providing a solid shank, in providing a drill having longitudinal grooves extending the full length thereof, with the greater portion of said grooves being arranged spirally and the remaining portion adjacent the butt end of the drill being straight, providing a transverse notch intersecting said straight grooves, forming a socket extending only partially through said shank and of a size to snugly receive the butt end of the drill, heating the shank, inserting the cold drill into said socket, immediately compressing the shank so as to cause it to tightly engage the drill and to force the metal of the shank into said notch and the straight portion of said grooves, and maintaining the compressing force until the metal of the shank is set.

In witness whereof, I hereunto subscribe my name to this specification in the presence of two witnesses.

HERMAN L. BARNES.

Witnesses:
JOHN MARTIN BARR,
DANIEL JOHN CUSACK.